United States Patent
Herbold

(10) Patent No.: US 8,014,412 B2
(45) Date of Patent: Sep. 6, 2011

(54) POWER SOURCING EQUIPMENT HAVING BIPOLAR JUNCTION TRANSISTOR FOR CONTROLLING POWER SUPPLY AND SUPPORTING AC DISCONNECT-DETECTION FUNCTION

(75) Inventor: Jacob Herbold, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 1510 days.

(21) Appl. No.: 11/406,334

(22) Filed: Apr. 19, 2006

(65) Prior Publication Data

US 2007/0133238 A1 Jun. 14, 2007

Related U.S. Application Data

(60) Provisional application No. 60/749,048, filed on Dec. 12, 2005.

(51) Int. Cl.
*H04L 12/28* (2006.01)
*H04L 12/56* (2006.01)
*H01L 21/70* (2006.01)
*H02M 7/02* (2006.01)
*H04M 9/00* (2006.01)

(52) U.S. Cl. ............ 370/419; 257/273; 326/80; 363/63; 455/402

(58) Field of Classification Search .................... 57/273; 326/80; 363/63
See application file for complete search history.

(56) References Cited

U.S. PATENT DOCUMENTS

| | | |
|---|---|---|
| 6,473,608 B1 | 10/2002 | Lehr et al. |
| 2003/0146765 A1 | 8/2003 | Darshan et al. |
| 2004/0073597 A1 | 4/2004 | Caveney et al. |
| 2004/0164619 A1 | 8/2004 | Parker et al. |
| 2005/0080516 A1 | 4/2005 | Pincu et al. |
| 2006/0112288 A1* | 5/2006 | Schindler ...................... 713/300 |
| 2006/0173581 A1* | 8/2006 | Elkayam et al. ............. 700/286 |
| 2006/0238252 A1* | 10/2006 | Crawley et al. ............... 330/253 |

OTHER PUBLICATIONS

International Search Report and Written Opinion issued in corresponding International Patent Application No. PCT/US2006/039273, mailed Feb. 20, 2007.
International Search Report and Written Opinion issued in corresponding International Patent Application No. PCT/US2006/043547, mailed Mar. 2, 2007.
IEEE Computer Society: 802.3af, "Part 3: Carrier Sense Multiple Access with Collision Detection (CSMA/CD) Access Method and Physical Layer Specifications Amendment: Data Terminal Equipment (DTE) Power via Media Dependent Interface (MDI)," IEEE Standards, Jun. 18, 2003, p. 1-121, The Institute of Electrical and Electronics Engineers, Inc, New York, New York.

(Continued)

*Primary Examiner* — Hassan Phillips
*Assistant Examiner* — Lonnie Sweet
(74) *Attorney, Agent, or Firm* — McDermott Will & Emery LLP

(57) ABSTRACT

A power supply system for providing power to a powered device over a communication link includes a power supply device capable of supporting an AC disconnect-detect function. The power supply device has a controller, an output port coupled to the communication link, and a bipolar junction transistor (BJT) controlled by the controller to provide power to the output port. The BJT may be turned off to present a high impedance required to support the AC disconnect-detection function.

8 Claims, 2 Drawing Sheets

OTHER PUBLICATIONS

Rohrmoser, M. et al., "Digital Connect ME Technical Product Specification," Jul. 2003, p. 1-7, UK, URL: http://www.entrix.co.uk/connect/data/digiConnectME_techprdspec.pdf.

"IntelliJack Switch Produktreihe," Aug. 2003, p. 1-4, URL: www.3com.de/pdf/intel_switch.pdf.

Linear Technology, "LTC4259A, Quad IEEE 802.3af Power over Ethernet Controller with AC Disconnect", 2003, pp. 1-32, URL: http://www/chipcatalog.com/Linear/LTC4259A.htm, Linear Technology Corporation, USA.

International Search Report and Written Opinion of The International Searching Authority issued in corresponding International Patent Application No. PCT/US2006/045242 dated Mar. 14, 2007.

International Search Report issued in International Patent Application No. PCT/US2006/047218, dated on Apr. 5, 2007.

"Power over Ethernet: Cisco Inline Power and IEEE 802.3af", XP-002383688, 1992-2004, p. 1-13, Cisco Systems, Inc. URL: http://www.cisco.com/warp/public/ss/neso/bbssp/peie_wp.pdf.

\* cited by examiner

POWER SOURCING EQUIPMENT HAVING BIPOLAR JUNCTION TRANSISTOR FOR CONTROLLING POWER SUPPLY AND SUPPORTING AC DISCONNECT-DETECTION FUNCTION

This application claims priority of provisional U.S. patent application No. 60/749,048 filed on Dec. 12, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for controlling application of power and supporting an AC disconnect function in Power Sourcing Equipment (PSE) of a Power over Ethernet (PoE) system.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting a PoE detection signature defined by the IEEE 802.3af standard.

If the detection signature is valid, the PD has an option of presenting a classification signature to the PSE to indicate how much power it will draw when powered up. Based on the determined class of the PD, the PSE applies the required power to the PD.

In typical 802.3af PoE applications, MOSFETs are used to control application of power to the PSE output port. MOSFETs are chosen because they cause low power loss. A properly sized MOSFET may have an on-resistance ($R_{ON}$) below 0.5Ω and thus causes a power loss such as 60 mW. In many 802.3af-compliant PSE implementations, sense resistor $R_{SENSE}$ used for sensing port current causes more loss than the MOSFET.

However, the IEEE 802.3af standard requires a PSE to monitor the link for the Maintain Power Signature (MPS) from a PD in order to remove power supplied to the PD if the MPS is absent for more than a predefined time period. Conventional circuitry combined with the MOSFET for supporting this function causes a substantial power loss.

The MPS consists of two components—an AC MPS component and a DC MPS component. A PSE may optionally monitor the AC MPS component only, the DC MPS component only, or both the AC and the DC MPS components. A PSE considers the AC MPS component to be present when it detects an AC impedance at its output port equal to or lower than 27 kΩ. A PSE considers the AC MPS component to be absent when it detects an AC impedance at its output port greater than 27 kΩ. A PSE should remove power from its output port when the AC MPS component has been absent for a time duration greater than the MPS drop out time limit, which is in the range from 300 ms to 400 ms.

The IEEE 802.3af standard requires a PSE that monitors the AC MPS component to meet certain parameter requirements. In order to comply with these requirements, a PSE with an AC disconnect-detection function conventionally has a diode in series with the MOSFET. The purpose of the diode is to provide the PSE output port with a high impedance when the port voltage is greater than the PSE power supply voltage. The diode achieves this goal by having a high impedance when reversed biased.

When the PSE supplies power to its output port, the diode is forward biased. In the forward biased condition, power loss in the diode is defined by $V_{BE} \times I_{PORT}$, where $I_{PORT}$ is the output current, and $V_{BE}$ is the voltage across the diode equal to 0.7V at 25° C. and to 0.6V at 75° C. As a result, the power loss may be in the range from 200 mW to 250 mW depending on temperature. Hence, the diode causes far more power loss than the MOSFET used for switching power to the port.

Therefore, it would be desirable to provide a PSE with a power-efficient output port arrangement that does not use a diode for supporting an AC disconnect-detect function.

SUMMARY OF THE DISCLOSURE

The present disclosure offers a novel system and methodology for supplying power to a powered device over a communication link. In accordance with one aspect of the disclosure, the power supply system includes a power supply device having a controller and an output port coupled to the communication link, and a bipolar junction transistor (BJT) controlled by the controller to provide power to the output port.

The power supply device may have an AC disconnect-detection pin for detecting an AC impedance at the output port. The BJT may be turned off to present a high impedance required to support detection of the AC impedance at the output port.

In accordance with an embodiment of the disclosure, sensing capacitance may be coupled to the AC disconnect-detection pin. The controller may supply a probing signal to the sensing capacitance for detecting the AC impedance at the output port.

The sensing capacitor may be coupled to a first electrode of the BJT to turn the BJT off in response to the probing signal supplied to the sensing capacitor.

A base of the BJT may be controlled by the controller to provide power to the output port when the BJT is on. A sense resistor may be connected to a second electrode of the BJT to monitor output current of the power supply device.

The power supply device may have a detection input for monitoring a prescribed parameter of the powered device. When the BJT is on, the detection input may be used for monitoring voltage on the output port. When the BJT is off, signals involved in detection and classification of the powered device may be monitored.

In accordance with another aspect of the disclosure, a Power over Ethernet (PoE) system comprises a Power Source Equipment (PSE) controller for controlling power applied to a Powered Device (PD) via an Ethernet link, and a PSE port connected to the Ethernet link. The controller is capable of detecting an AC component of a PD signature. The PoE system has a BJT controlled by the PSE controller to apply power to the PSE port, and configured to support detection of the AC component of the PD signature.

In accordance with an embodiment of the disclosure, the BJT may have a first electrode coupled to sensing capacitance that supports detection of the AC component of the PD signature. Further, the BJT may have a base driven by the PSE controller to control application of power to the PSE port, and a second electrode coupled to a sense resistor arranged for monitoring current in the PSE port.

The BJT may be configured to turn on to support application of power to the PSE port, and to turn off to support detection of the AC component of the PD signature.

In accordance with a method of the present disclosure, the following steps are carried out to supply power from a power supply port to a powered device over a communication link:

driving a base of a BJT to control application of power to the power supply port, and turning the BJT off to support detection of an AC impedance at the power supply port.

The BJT may be turned off in response to a probing signal produced to detect the AC impedance at the power supply port.

The AC impedance at the power supply port may indicate a state of the powered device coupled to the power supply port over the Ethernet link.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a power supply device having a bipolar-junction transistor in a PoE system. It will become apparent, however, that the concepts described herein are applicable to any power supply system that monitors a state of a powered device. For example, the system of the present disclosure may be provided in a local area network (LAN) having a plurality of nodes, a network hub and communication cabling connecting the nodes to the network hub for providing data communications. The network hub may include the power supply device having a bipolar junction transistor for controlling application of power to a load over the communication cabling, and supporting detection of a required parameter of the load.

Figure 1:
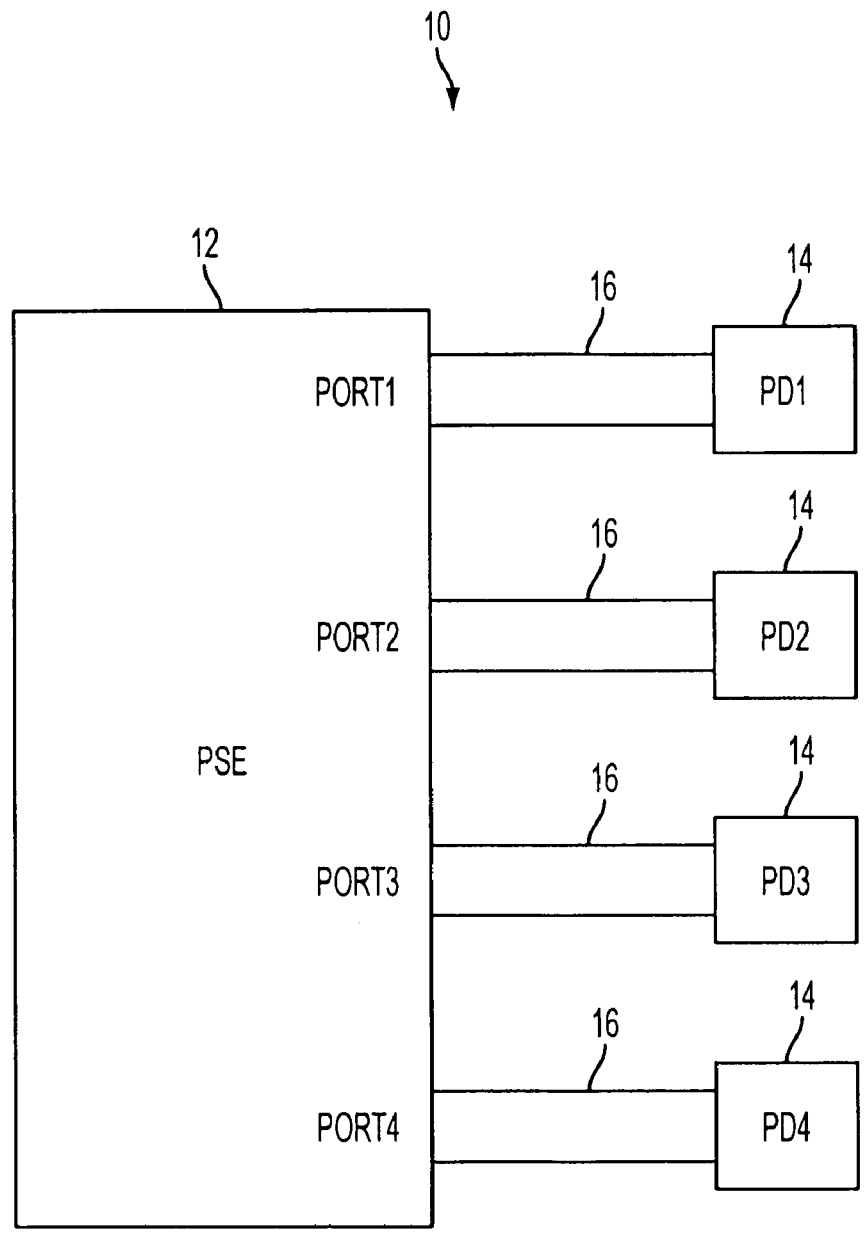
FIG. 1 is a diagram illustrating a PoE system of the present disclosure.

FIG. 1 shows a simplified block-diagram illustrating a Power over Ethernet (PoE) system 10 including Power Sourcing Equipment (PSE) 12 having multiple ports 1 to 4 connectable to Powered Devices 14 (PD1 to PD4) via respective links, each of which may be provided using 2 or 4 sets of twisted pairs within an Ethernet cable 16. Although FIG. 1 shows four ports of the PSE 12, one skilled in the art would realize that any number of ports may be provided.

The PSE 12 may interact with each PD in accordance with the IEEE 802.3af standard. In particular, the PSE 12 and the PD participate in the PD detection procedure, during which the PSE 12 probes a link to detect the PD. If the PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD is in a state where it will not accept power.

If the signature is valid, the PD has an option of presenting a classification signature to the PSE to indicate how much power it will draw when powered up. For example, a PD may be classified as class 0 to class 4. Based on the determined class of the PD, the PSE applies the required power to the PD.

After the power is provided, the IEEE 802.3af standard requires the PSE 12 to monitor the respective link for the Maintain Power Signature (MPS) from the PD in order to remove power supplied to the PD if the MPS is absent for more than a predefined time period. The MPS consists of two components—an AC MPS component and a DC MPS component. A PSE may optionally monitor the AC MPS component only, the DC MPS component only, or both the AC and the DC MPS components.

The PSE 12 of the present disclosure is configured to perform an AC disconnect-detection function defined by the IEEE 802.3af standard by monitoring the AC MPS component and remove power from the port is the AC MPS component is absent for a predetermined time period. The AC MPS component may be monitored with or without the DC MPS component.

The PSE 12 considers the AC MPS component to be present when it detects an AC impedance at the respective port equal to or lower than 27 kΩ. The PSE 12 considers the AC MPS component to be absent when it detects an AC impedance at the respective port greater than 27 kΩ. The PSE 12 should remove power from the port when the AC MPS component has been absent for a time duration greater than the MPS drop out time limit, which is in the range from 300 ms to 400 ms.

The AC disconnect-detection function performed by the PSE 12 involves applying an AC probing signal in addition to the 48 V DC operating voltage. Thereafter, an AC signal returned from the PD is sensed to determine whether the AC impedance at the port exceeds a threshold value set above 27 kΩ, thereby indicating that the PD has been unplugged from the link or that the PD has removed its AC MPS component.

When the AC impedance at the port is above the threshold value, the PSE 12 removes power supplied to the port.

Figure 2:
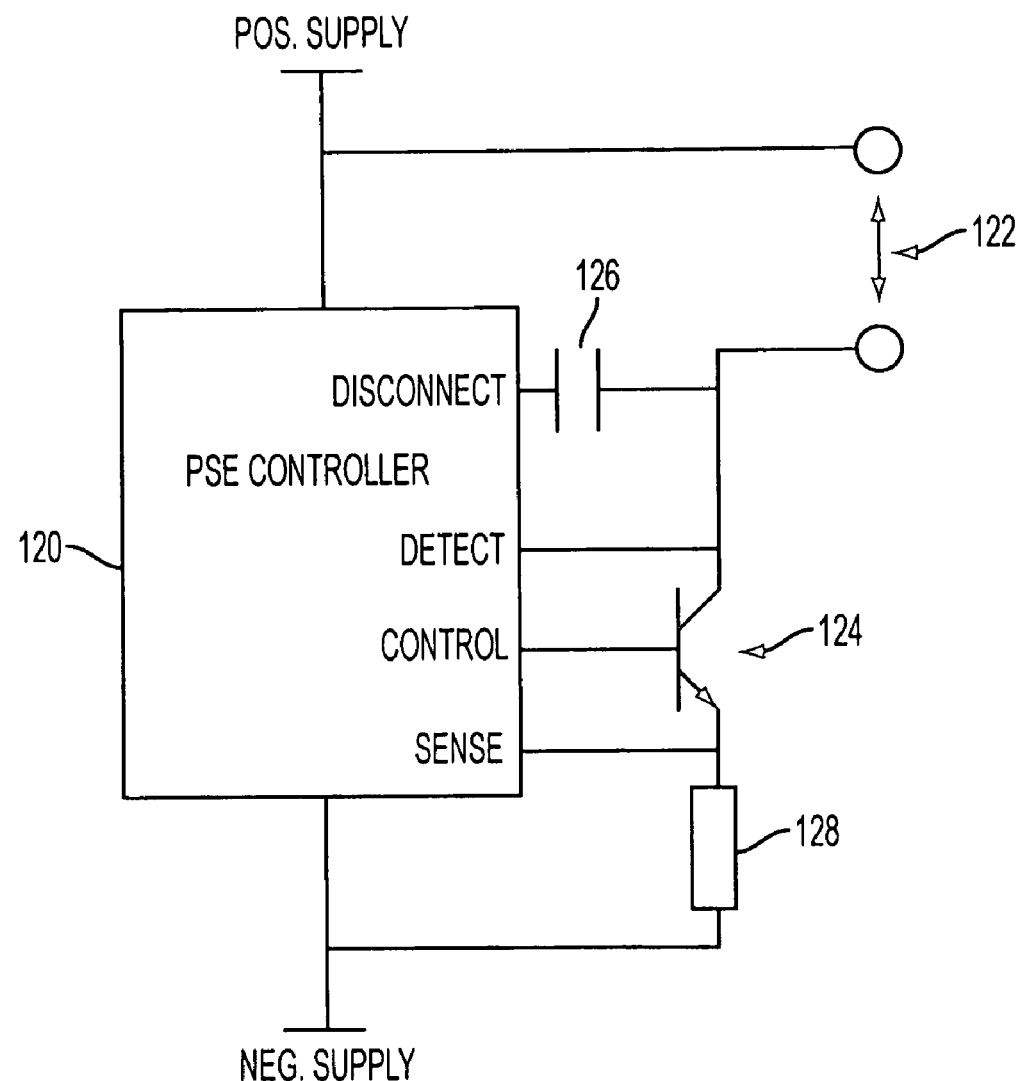
FIG. 2 is a diagram illustrating arrangement of a BJT for supporting power switching and an AC disconnect-detect function.

FIG. 2 schematically illustrates an example of the PSE 12 that supports an AC disconnect-detect function. The PSE 12 may include a PSE controller 120 and a PSE port 122 connected to the Ethernet link. The PSE controller 120 controls operations required to detect and classify a PD, supply it with power and monitor the PD when the power is supplied.

In particular, the PSE controller 120 controls supplying power to a powered device via the PSE port 122. A bipolar-junction transistor (BJT) 124 is connected between the PSE controller 120 and the PSE port 122 to enable the PSE controller 120 to control applying power to the PSE port 122. When the BJT 124 is in an on-state, power is applied to the PSE port 122. The BJT 124 may be controlled to modify the amount of the port current. When the BJT 124 is in an off-state, power is removed from the PSE port 122. As discussed in more detail below, the base of the BJT 124 is supplied with a power control signal produced by the PSE controller 120 to control current in the PSE port 122 or to remove the power from the PSE port 122 in response to prescribed events.

Further, the PSE controller 120 has an AC disconnect pin for monitoring an AC impedance at the PSE port 122. Via this pin, the PSE controller 120 applies an AC probing signal supplied via the PSE port 122 to the PD 14 in addition to the 48 V DC operating voltage. For example, the AC probing signal may be a time-varying voltage signal having sinusoidal, trapezoidal or any other waveform with a controlled slope. The PSE controller 120 applies the AC probing signal to an AC disconnect sensing capacitor 126 connected between the AC disconnect pin and the PSE port 122. The AC disconnect pin monitors the peak current flowing in the AC disconnect sensing capacitor 126 in response to the AC probing signal to enable the PSE controller 120 to detect when the AC impedance at the PSE port 122 exceeds a threshold value indicating that the AC MPS component is absent.

The emitter of the BJT 124 is connected to a current sense input of the PSE controller 120. The current sense input monitors the output current of the PSE 12 using a sense resistor 128 connected to the emitter of the BJT 124. When power is supplied to the PD, the PSE controller 120 may monitor the output current with respect to certain current limit thresholds, such as the maximum output current of the PSE at a short circuit condition ($I_{LIM}$), and the overload current detection range ($I_{CUT}$). In particular, the PSE should be able to withstand without damage the application of short circuits of any wire to any other wire within a power supply cable, if the magnitude of the current through such a short circuit does not exceed $I_{LIM}$. Further, an overload condition may be detected when an output current of the PSE exceeds $I_{CUT}$ for a time period exceeding an overload time limit ($T_{ovld}$). For example, the value of $I_{LIM}$ may be maintained at 425 mA, while the value of $I_{CUT}$ may be kept at 375 mA.

The PSE control circuit 120 monitors the output current by monitoring voltage Vsense across the sense resistor 128 coupled to the emitter of the BJT 124. The PSE controller 120 may control the base voltage of the BJT to reduce the emitter current of the BJT 124 when the monitored voltage Vsense exceeds the threshold voltage $V_{LIM}$ which may be determined as $I_{LIM} \times Rs$, where Rs is resistance of the sense resistor 128.

Further, the PSE controller 120 may determine when the monitored voltage Vsense exceeds the threshold voltage $V_{CUT} = I_{CUT} \times Rs$ for a time period exceeding a predetermined time interval, in order to remove power supplied to the PSE port 12. In particular, the PSE controller 120 may have an overload timer activated when the sense voltage Vsense exceeds the threshold voltage $V_{CUT}$. If the sense voltage Vsense is still above the $V_{CUT}$ level when an overload time limit defined by the timer expires, the PSE controller 120 may turn off the BJT 124 to remove the power supplied to the PSE port 122. For example, the overload time limit may be in the range between 50 ms and 75 ms to comply with the IEEE 802.3af standard.

Further, the collector of the BJT 124 may be connected to a detect input of the PSE controller 124. When the BJT 124 is off, the PSE controller 120 may use the detect input for monitoring signals involved in PD detection and classification procedures. When the BJT 124 is on, the detect input may be used to monitor voltage on the PSE port 122. For example, this voltage may be monitored to prevent overheating of the BJT 124.

In addition to controlling application of power to the PSE port 122, the BJT transistor 124 supports an AC disconnect-detection function. In particular, as discussed above, when power is applied to the PSE port 122, the BJT 124 is on. In this state, the voltage on the collector of the BJT 124 is close to the negative supply voltage. When the PSE controller 120 produces an AC probing signal for detecting the AC impedance at the PSE port 122, the AC probing signal drives the AC disconnect sensing capacitor 126 that applies a negative potential to the collector of the BJT 124. When the voltage at the collector of the BJT 124 becomes more negative than the voltage at its base, the BJT 124 turns off and creates a high impedance required to provide AC disconnect-detection operations. This high impedance enables the PSE controller 120 to disregard the PSE's output impedance when it determines the AC impedance at the PSE port 122. As a result, the PSE controller 120 may detect a high AC impedance at the PSE port 122 based on the peak current flowing through the AC disconnect sensing capacitor 126.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for supplying power to a powered device over a communication link, comprising:
   a power supply device having a controller and an output port coupled to the communication link,
   a bipolar junction transistor (BJT) controlled by the controller to provide power to the output port,
   the BJT being controlled to increase impedance of the BJT so as to enable the controller to detect an AC impedance at the output port, wherein
   the power supply device further comprises an AC disconnect-detection pin for detecting the AC impedance at the output port,
   the BJT is configured to turn off to support detection of the AC impedance at the output port, and sensing capacitance is coupled to the AC disconnect-detection pin for supporting detection of the AC impedance at the output port, the sensing capacitor further being coupled to a first electrode of the BJT to turn the BJT off in response to a probing signal supplied to the sensing capacitance.

2. The system of claim 1, wherein a base of the BJT is controlled by the controller to provide power to the output port when the BJT is on.

3. The system of claim 2, wherein a sense resistor is connected to a second electrode of the BJT to monitor output current of the power supply device.

4. The system of claim 1, wherein the power supply device further comprises a detection input for monitoring a prescribed parameter of the powered device.

5. The system of claim 4, wherein the power supply device is configured to monitor voltage on the output port via the detection input when the BJT is on.

6. The system of claim 5, wherein the power supply device is configured to monitor signals involved in detecting the powered device when the BJT is off.

7. A method of supplying power from a power supply port to a powered device over a communication link, comprising the steps of:
   driving a base of a BJT having an electrode coupled to the power supply port, to control application of power to the power supply port, and
   increasing impedance of the BJT to enable detection of an AC impedance at the power supply port, wherein
   the BJT is turned off in response to a probing signal produced to detect the AC impedance at the power supply port.

8. The method of claim 7, the AC impedance indicates a state of the powered device coupled to the power supply port over an Ethernet link.

* * * * *